Patented Jan. 17, 1933

1,894,629

UNITED STATES PATENT OFFICE

EDWARD ARTHUR MURPHY, OF ERDINGTON, BIRMINGHAM, ROBERT GILBERT JAMES, OF SELLY OAK, BIRMINGHAM, AND DOUGLAS FRANK TWISS, OF WYLDE GREEN, ENGLAND, ASSIGNORS TO AMERICAN ANODE INCORPORATED, OF AKRON, OHIO, A CORPORATION OF DELAWARE

MANUFACTURE OF ARTICLES OF/OR CONTAINING RUBBER OR SIMILAR MATERIALS

No Drawing. Application filed September 9, 1930, Serial No. 480,812, and in Great Britain September 23, 1929.

This invention concerns improvements in the manufacture of articles of or containing rubber or similar materials by forming deposits of aqueous emulsions or dispersions thereof on supports or backing strata and has particular reference to such manufacture in which the supports are previously coated with a coagulating medium of acid reaction comprising an acidified aqueous emulsion or dispersion also of or containing rubber or similar material.

The invention comprises coating supports or backing strata which may be shaped such as formers or moulds with an acidified aqueous emulsion or dispersion of acid reaction of or containing rubber or similar material and, if desired, wherein the individual particles thereof possess an electric charge of opposite character to that of the main normal emulsions or dispersions and thereafter coating the thus treated supports or backing strata with the main normally charged aqueous emulsions or dispersions of the kinds hereinafter specified. The prior coating of acidified emulsion or dispersion of acid reaction effects or facilitates the coagulation of the main adhering emulsion or dispersions subsequently applied. If desired, the coagulation of the coatings of emulsions or dispersions aforesaid may be aided by the application of further coagulating means, as for example, another coating of the acidified aqueous dispersions of acid reaction.

The invention also includes the manufacture of articles of appreciable thickness by repeated coatings with the main and the coagulating acid-reacting emulsions or dispersions aforesaid.

The main emulsions or dispersions as well as the acidified emulsions or dispersions of acid reaction can be applied by any one or more of the known operations of dipping, spreading or spraying. The supports or backing strata or formers may be of any suitable material such as glass, metal, porcelain, clay or fabric. If desired, formers such as are attacked by acid, for instance, metallic formers such as zinc, can be given a coating with a non-reactive material prior to use. These coatings can be, for instance, of rubber, bitumen or cellulose acetate.

The use of such an acidified aqueous emulsion or dispersion prevents premature slipping, on the dipping former, of the coagulated deposits obtained. This is probably due to the early formation of a thin layer of initially acidic coagulum at the surface of the former. The usual tendency of a latex deposit to drain away from sharp or rounded surfaces, for example, the edges of a tobacco pouch former, is also obviated.

If desired, the acidified latex bath can be concentrated and/or compounded with known compounding ingredients; it may also be thickened by the addition of thickening agents such as saponin. Furthermore, the fact that the outer surface of the deposit does not come into contact with any external setting or coagulating medium ensures that the natural glossy character of the outer surface of the fluid deposit is retained after solidification.

The main emulsions or dispersions as well as the acidified dispersions of acid reaction comprise natural or artificial aqueous dispersions of rubber or similar vegetable resins such as gutta-percha or balata with or without the addition of the aqueous dispersions or emulsions of rubber-like substances, such as the so-called synthetic rubbers or mineral rubber or rubber substitutes such as factice or rubber reclaim or rubber waste or oils, e. g. rape oil or vulcanized oils or cellulose esters or proteins, e. g. casein.

The emulsions or dispersions may be concentrated and/or compounded or vice versa. The emulsion or dispersions can also, if desired, be prevulcanized. The compounding ingredients may be chosen from vulcanizing agents such as sulphur, fillers and reinforcing agents such as whiting, clay, barium sulphate, lithopone, lamp black, gas black, zinc oxide or even powdered abonite or vulcanite, accelerators of vulcanization, colouring matters, preservatives or softeners.

Aqueous dispersions of synthetic rubbers with or without any one or more of the hereinbefore mentioned compounding ingredients may also be used.

An example of carrying the invention into effect is as follows:—

An acid latex coagulating bath of the following composition—

| | Parts by weight |
|---|---|
| Rubber | 46.5 |
| Acetic acid | 52.0 |
| Casein | 0.93 |
| Water | 130.0 | is made up as follows:—

Casein is wetted with ten times its weight of warm water (50° C.) and ammonia is added little by little with constant stirring until an opalescent colloidal solution is formed. An equal volume of water is then added and the solution is mixed with the required amount of latex together with sufficient water to give a final rubber content of 30%. The original alkalinity of the latex should be reduced to give a low alkalinity in the final latex mixture e. g. 0.01 or less expressed as ammonia on the total volume.

A solution consisting of the stated proportion of acetic acid mixed with half its volume of water is then added as rapidly as possible to the casein latex dispersion with continuous stirring.

The acid latex so obtained is filtered, e. g. through muslin gauze. A former is then dipped into the dilute dispersion of acid latex, the former is withdrawn, allowed to drain for a few seconds and then dipped into the main latex mixing containing, for example, 60% total solids and of the following composition:—

| | Parts by weight |
|---|---|
| Rubber | 89.2 |
| Sulphur | 2.5 |
| Accelerator | 0.3 |
| Zinc oxide | 2.0 |
| Mineral oil | 5.0 |
| Pigment | 1.0 |

The dipping former is allowed to remain immersed in this mixing for five to twenty minutes according to the thickness of the deposit required. It is then withdrawn, inverted and allowed to stand. Within thirty to sixty seconds after removal the deposit sets throughout and may be dried and vulcanized in known manner.

This invention has been found applicable to the manufacture of articles of rubber of moderate or substantial thickness such as, for example, tobacco pouches, gloves with or without fabric lining, rubber sheeting, fabric reinforced rubber articles, rubberized fabric and rubber footwear.

What we claim is:—

1. A process for the manufacture of rubber articles which comprises coating a form successively with two aqueous dispersions of rubber, one of which is acid in nature and the other coagulable by acid.

2. A process for the manufacture of rubber articles which comprises coating a form alternately with a plurality of layers of two aqueous dispersions of rubber, one of which is acid in nature and the other coagulable by acid.

3. A process for the manufacture of rubber articles which comprises coating a form with a strongly acid aqueous dispersion of rubber, and immersing the coated form in an aqueous dispersion of rubber which is coagulable by acid.

4. A process for the manufacture of rubber articles which comprises coating a form successively with an acid aqueous dispersion of rubber, the particles of which carry positive electric charges, and with an aqueous dispersion of rubber the particles of which carry negative electric charges.

5. A process for the manufacture of rubber articles which comprises coating a form with an acid aqueous dispersion of rubber, the particles of which carry positive electric charges, and immersing the coated form in an alkaline normal rubber latex until a coagulated layer of rubber of substantial thickness is formed.

6. A process for the manufacture of rubber articles which comprises coating a form with an acid aqueous dispersion of rubber, the particles of which carry positive electric charges, immersing the coated form in an alkaline normal latex, and repeating the treatments with the acid dispersion and the latex.

In witness whereof, we have hereunto signed our names.

EDWARD ARTHUR MURPHY.
ROBERT GILBERT JAMES.
DOUGLAS FRANK TWISS.